United States Patent [19]

Westerdale

[11] Patent Number: 4,789,281

[45] Date of Patent: Dec. 6, 1988

[54] AUTOMOBILE HAULING TRAILER

[75] Inventor: Norman R. Westerdale, Grand Blanc, Mich.

[73] Assignee: Autohaul Industries, Inc., Flint, Mich.

[21] Appl. No.: 79,567

[22] Filed: Jul. 30, 1987

[51] Int. Cl.[4] .............................................. B60P 3/08
[52] U.S. Cl. .................................. 410/29.1; 180/286; 296/26; 296/61
[58] Field of Search .................. 105/370, 377; 296/26, 296/61, 100; 410/3, 4, 24, 26, 29.1; 180/286

[56] References Cited

U.S. PATENT DOCUMENTS

| | | | |
|---|---|---|---|
| 1,994,695 | 3/1935 | Dolan et al. | 410/29 |
| 2,520,698 | 8/1950 | Sniezyk | 410/29.1 |
| 2,893,329 | 7/1959 | Janeczko | 105/377 |
| 2,918,326 | 12/1959 | Antaramian | 410/29.1 |
| 2,974,999 | 3/1961 | Stuart | 296/100 |
| 3,155,423 | 11/1964 | Cripe | 296/100 |
| 3,642,156 | 2/1972 | Stenson | 296/61 |
| 3,834,565 | 9/1974 | Goodman, Jr. et al. | 296/61 |
| 3,880,457 | 4/1975 | Jones, Jr. | 410/29.1 |
| 4,369,008 | 1/1983 | Cooper | 410/29.1 |
| 4,406,477 | 9/1983 | McDonald | 410/24 |
| 4,668,141 | 5/1987 | Petersen | 105/382 |

*Primary Examiner*—George L. Walton
*Attorney, Agent, or Firm*—Krass & Young

[57] ABSTRACT

The invention is a trailer for carrying assembled automobiles, designed to be towed on the highway by a conventional motorized truck-tractor unit. The trailer is equipped with hoisting points to facilitate lifting and transporting the trailer unit from above by cargo container handling cranes, such as those found at shipyards and railyards. In addition, the trailer is equipped with hydraulic valves and hydraulic cylinders which serve to control the position of numerous tracks within the body of the trailer. These tracks accommodate the tires of the automobile cargo carried within the trailer. By adjustment of the hydraulic cylinders supporting the multiple tracks, the internal storage configuration of the trailer can be varied, to accommodate a wide variety of makes, models and numbers of automobiles, and to ensure that said automobiles are carried in a suitable position for safe transport. The trailer body is designed to accommodate the fittings and fixtures on most commonly used flattop railroad cars, and also features three in-line road wheels on each side of the trailer body, and three separate axles supporting each pair of wheels disposed on opposite sides of the trailer. The additional space created between the opening between the wheels on opposite ends of the same axle allows the trailer to accommodate one additional vehicle within the body of the trailer, while still providing sufficient tire surface to satisfy the highway load requirements of most states. As an additional feature, the hinged top of the trailer, which opens to accommodate the loading process, is connected to the rear tailgate and side doors of the trailer with a series of mechanical interlocks, ensuring that when the trailer top and rear door of the trailer are closed and locked, the side doors of the trailer are likewise closed and locked.

21 Claims, 2 Drawing Sheets

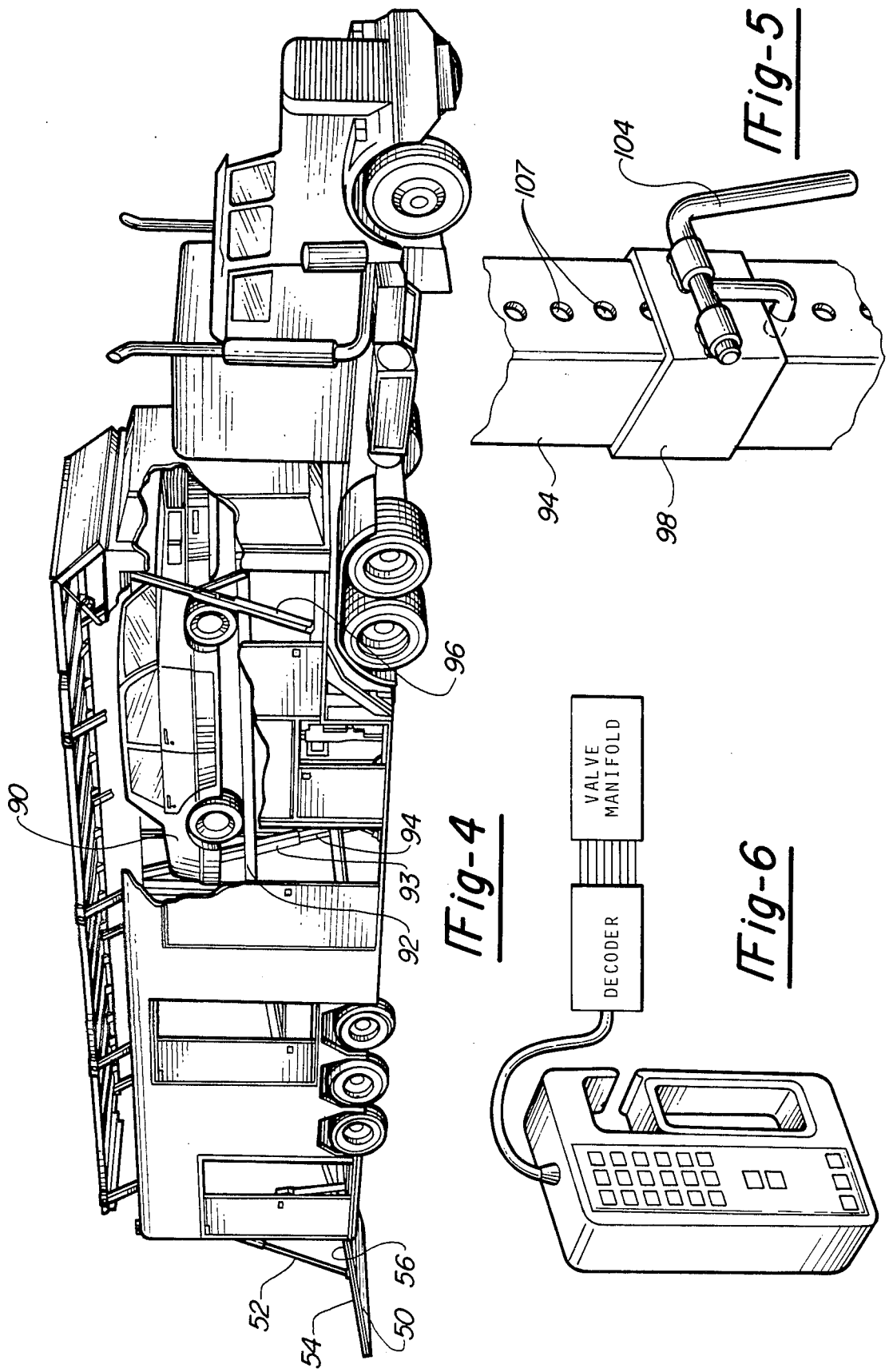

AUTOMOBILE HAULING TRAILER

FIELD OF THE INVENTION

The invention deals with wheeled trailers for the carrying of completely assembled automobiles, and more specifically, such trailers to function as containers which may be carried on flat railroad cars and aboard ship as well.

BACKGROUND OF THE INVENTION

Trailers for the hauling of completed automobiles are well known in the art. Likewise, containers or trailers for completed automobiles which are suitable for placement on railroad cars and in cargo ships are likewise well known. Moreover, covered or completely enclosed trailers or containers have commonly been used or experimented with for the transportation of completed automobiles.

Completely enclosed trailers, however, have, to date, exhibited serious shortcomings in the economical transportation of motor vehicles. Typically, such containers must be of suitable size for convenient hauling of cargo on the highways. This requirement imposes several limitations on the size and weight of the trailer, including, but not limited to, the vehicle height and the loads imposed by each axle on the road surface. Typically, no more than four automobiles have been successfully carried in an enclosed trailer suitable for transportation on the highways. Conventional tandem axle configurations result in the placement of four wheels, two on each side of the center of load of the trailer. The overall width restrictions of most roadways limit the distance between the outer surfaces of the wheels outboard located on a single axle. Each pair of inboard wheels, therefore, encroaches upon the trailer cargo area, creating limitations in the height of the interior space of the trailer available for vehicle storage.

Similarly, both open and closed vehicular trailers currently are limited to a maximum load of eight small vehicles, by the same dimensional limitations above described. Vehicles are typically stored within the confines of the trailer by driving the vehicle onto a series of movable tracks. The access restrictions imposed by the closed sides of a closed container make manual manipulation of the positions of the tracks difficult, and prior examples of this art have accepted this limitation by restricting the number of vehicles carried. Open trailers are more easily adapted to a wide variety of styles of vehicles carried as cargo, but nevertheless are unable to accommodate more than eight vehicles and do not contain mechanisms for easily balancing and adjusting the load. Likewise, open vehicles are much more prone to exposing the cargo to typical road damage from inclement weather, vandalism and theft. Furthermore, open vehicles are not easily accommodated as units of cargo for railroads and seagoing vessels.

The within invention overcomes all of the foregoing limitations by providing a completely enclosed vehicular carrier suitable for handling as a closed container as well as a highway vehicle, while accommodating a larger number of vehicles and allowing wide adjustments in the method of carrying the load through the use of remotely controlled hydraulic positioners. Hydraulically activated tailgate and tops simplify the loading process, while a series of doors allows easy access.

SUMMARY OF THE INVENTION

The within invention comprises a unitary, completely enclosed highway trailer using in-line wheels. The top and tailgate are hydraulically controlled and interconnected with a plurality of sliding side doors. The invention contains a number of features which allow the trailer to be accepted by a wide variety of railroad cars, as well as to be loaded to and from railroad cars and container seagoing ships. A system of self-contained hydraulics which are remotely, electronically controlled, allows a wide variety of positions for motor vehicles carried within the trailer. The trailer itself is designed to be water tight, and to allow a single loading of the cargo vehicles at the manufacturer's location, and a single discharge of the vehicles at the destination automobile dealer, even though the trailer/container may be transported by a tractor unit on the highway, by flatbed railcar or by cargo ship.

BRIEF DESCRIPTION OF THE DRAWINGS

FIG. 4 is a cutaway view of the trailer in a loading configuration;
FIG. 5 is a detail view of the track position stops;
and
FIG. 6 is a perspective view of the electronic controls.

DESCRIPTION OF THE PREFERRED EMBODIMENT

Figure 2:
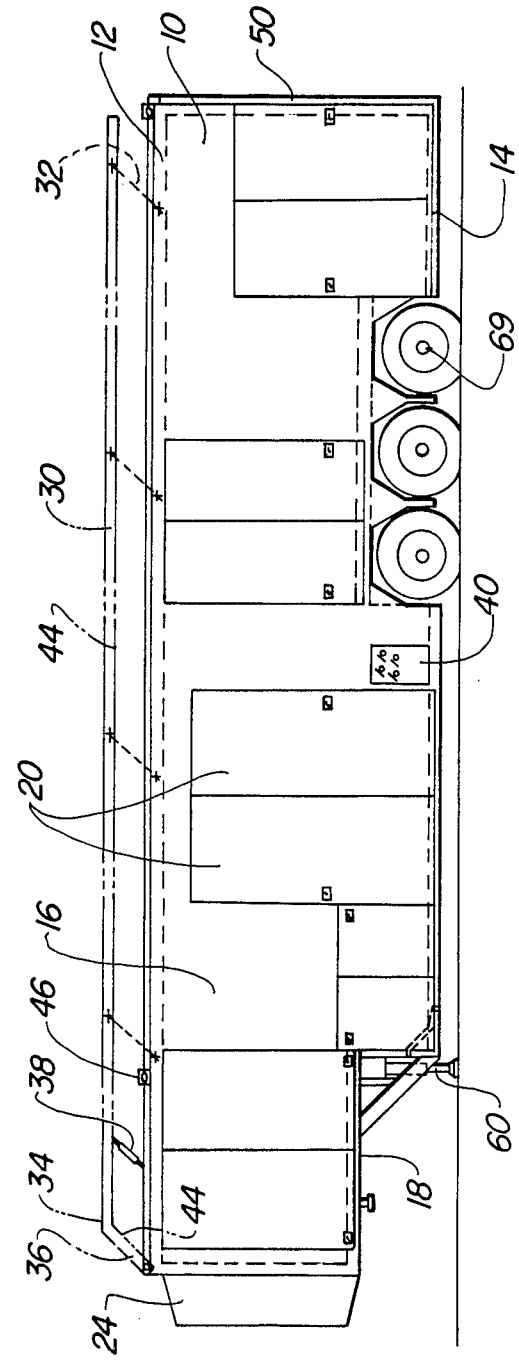
FIG. 2 is a side view of the trailer, showing the position of the framework and other individual components.

Referring now to FIG. 2, a side view of the trailer is presented, showing a majority of the external features. A trailer enclosure 10 is constructed of a rigid framework 12 and chassis 14, with rigid side panels 16. The rigid side panels are secured to the framework using conventional fasteners so as to create an essentially closed box-like structure, which is essentially of hollow interior. The profile of the trailer includes an extension 18, which protrudes over the tongue of the trailer to offer additional storage space in the interior of the trailer.

In the preferred embodiment, the trailer is equipped with multiple sliding doors 20 which allow entry into the trailer and manipulation of the contents, without the need for excessive exterior room in which to manipulate swinging doors. In the preferred embodiment, these doors are located so as to allow good access to all contents of the trailer.

The forward portion of the extension 18 is equipped with a fiberglas cover 24 which serves to both extend the usable cargo area within the confines of the trailer, as well as to improve the aerodynamic efficiency of the forward surface of the trailer. The trailer roof 30 is mounted to the trailer body through a series of hinges 32, which hinges are double acting, maintaining hinge points at both the trailer frame as well as the roof frame. A hinge 34 and second hinge 36 at the forward portion of the roof allow vertical deployment of the roof, to permit raising up and away from the trailer, thereby allowing the additional clearance required by many vehicles to be carried as cargo during the loading process. The roof is operated to its raised and lowered position through the use of hydraulic cylinders 38 which are coupled to a control panel 40. The edges of the roof are equipped with a channel designed to allow sealing of the edges of the roof against the sides of the trailer, thereby directing water from the roof away from the roof and down the sides of the exterior of the trailer. A series of seals (44) serves to protect the hinge area from inflow of water, as well.

Mounted to and integral with the framework of the trailer sides are a set of four ISO lifting points (46) to facilitate lifting and transportation of the trailer, by conventional hoisting equipment.

A tailgate 50 is hinged at its lower edge, thereby mating the tailgate and the trailer body together through a pivoting edge. A pair of hydraulic actuators 52 serves to raise and lower the tailgate as a unit. The tailgate, when lowered, serves as a loading ramp for the vehicles to be carried within the trailer. The tailgate is equipped with integral tracks 54 and transitional tracks 56 which move into position automatically at the time the tailgate is lowered. This results in the absence of any loose or disconnected ramp hardware, and obviates the need for any separate steps in preparing a ramp for vehicle loading on the trailer. A maximum 6° angle is maintained throughout the ramp/tailgate area, thereby minimizing potential damage to vehicles during the loading/unloading process as a result of vehicle dragging. The hydraulic controls for the tailgate are co-located with the hydraulic controls for the roof (40). When the tailgate and roof are in the open position, a series of mechanical interlocks is relaxed, allowing opening of all sliding doors. When the tailgate and roof are in the closed position, the same series of mechanical interlocks secures the sliding doors of the trailer in the closed and locked positions.

The trailer is equipped with an integral jack stand 60 to allow the trailer to maintain a level configuration when separated from a tractor unit. Moreover, to accommodate the stanchions commonly found in TTUX flat rail cars, the forward lower portion of the trailer, immediately aft of the extension, incorporates a cavity 66 to ensure clearance of said stanchions.

Figure 3:
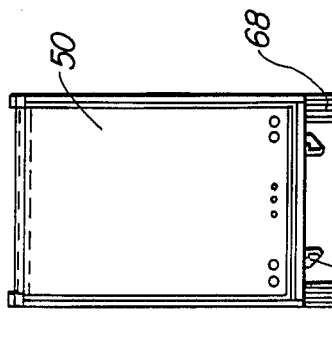
FIG. 3 is a view of the invention from the rear.
Figure 1:
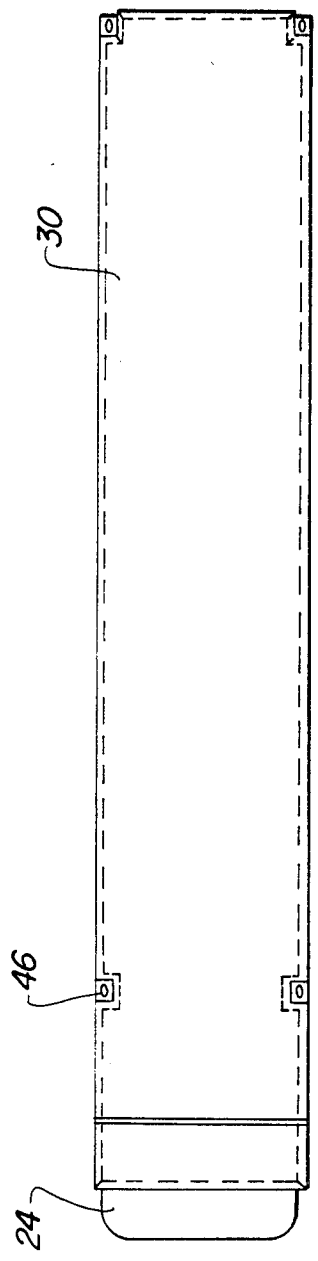
FIG. 1 is a top view of the trailer.

Referring now to FIG. 3, it can be seen that the six load carrying wheels (68) for the trailer are oriented in-line, three wheels on each side of the trailer unit, with three separate axles 69, each carrying one pair of wheels. Unlike the usual configuration of tandem wheels for the vehicle hauling trailers, the present invention allows additional internal cargo storage area between each pair of opposed wheels, thereby creating the necessary additional room for one additional vehicle. Moreover, the use of three separate wheels on each side of the trailer results in better fore and aft weight distribution of the trailer's cargo, thereby increasing the total gross weight of the cargo which may be maintained. Typically, conventional tandem axle trailers are limited to maximum weights of approximately 36,000 lbs. The configuration disclosed in the present invention allows for an increase of that weight to 42,000 lbs.

Because numerous flat rail cars and cargo holding surfaces of other types are designed to accommodate typical tandem axle trailers, restraining guide plates 70 are located inboard of each wheel, and each axle, and securely mounted to the bottom frame of the trailer. These plates simulate the positions to be maintained by the inboard surfaces of the inboard pair of wheels in a conventional twin wheel arrangement, allowing the restraining guides commonly found on rail cars and similar loading surfaces to function in exactly the same fashion with the present invention as with the conventional twin wheel arrangement.

Referring now to FIG. 4, a cutaway view of the trailer in a first loading configuration is depicted. In this view, a conventional load of eight standard size automobiles can be seen, with the cargo vehicles being shown in profile. Each cargo vehicle 90 is supported within the trailer on tracks 92 which are secured to the internal framework of the trailer through a series of sliding sleeves 93, vertical support guideposts 94, hydraulic cylinders 96 and locking collars 98. Each of the vehicle is supported on two tracks, one track on each side of the vehicle. Each track is essentially an elongated flat steel panel, the horizontal portion of which serves to act as the supporting surface. Referring to FIG. 5, each track, accordingly, is secured at each end by a sliding sleeve and collar 98 which is secured to one of several vertical support members disposed throughout the interior of the trailer. Each vertical support member is further equipped with a series of equally spaced holes 107, and further equipped with a locking collar having a pivotal pin 104 which may be inserted under or through the sliding collar into the holes on the vertical support, thereby fixing the locking collar to the vertical support at any predetermined level. Each end of each track is further connected to an actuator, e.g., a hydraulic cylinder, which is independently controllable as herein described. Each hydraulic cylinder offers the necessary mechanical force to reposition the vertical height of each end of the track above the floor of the trailer.

The locking collar 98 acts to secure the tracks in position for transport. Liquid or gas operated actuators are subject to leakage and compression of the operating fluid (liquid or gas) and are accordingly unsuitable for long term support of the substantial loads imposed by the weight of a motor vehicle. To secure the tracks in fixed position in relation to the vertical supports, locking collars 98 are disposed on each vertical support. As can be seen in FIG. 9, the locking collars are configured, when viewed from the side, with the vertical dimension on one side of the collar to be greater than the vertical dimension of the opposing side. Since a single locking pin is used to secure the collar in position, the vertical load on the collar, combined with the asymmetrical support resulting from a single locking pin location, acts to twist the collar's vertical central axis at a determinable angle from the vertical central axis of the vertical support. The angle 100 imparted to the upper bearing surface of the collar 98 is computed to result in a substantially horizontal orientation to the upper surface of the collar under load, placing the locking pin in shear load. The locking pin is of substantially "L" shape, and the upper portion of said pin is pivotably mounted to the external wall of the locking collar 98. In this manner, the locking pin is pivotable into and away from the holes disposed along the length of the vertical support guidepost. This allows each collar to be slid along the length of each corresponding vertical support following positioning of each track by means of the associated actuators. The collars are moved to a position directly under the sleeve mounted to each track, thereby securing the track against downward movement.

To allow operation of the locking pins from a remote location, for example, with a reach pole or the like, an extension is affixed to each locking pin. The extension is disposed so as to protrude away from the side of the locking collar, so that it may be engaged by a tool without interference.

Each hydraulic cylinder is, in turn, connected through a manifold to a source of hydraulic fluid under specified pressure. Each cylinder has associated therewith a separately controllable valve which regulates the hydraulic pressure to each specific cylinder. In turn, each individual hydraulic valve is separately controllable through an electrical decoder/driver circuit. In the preferred embodiment, four banks of hydraulic valves are located within the trailer, one at each corner of the interior. A self-contained hydraulic reservoir and pump are located within the trailer, requiring only an external source of electrical power to operate the hydraulic system.

The position of each hydraulic cylinder is regulated by electrical inputs received from a remote switch array. The remote switch array, mounted in a handheld container, is shown at FIG. 6. The remote switch array contains switches for each of the hydraulic cylinders located within the enclosure, and further contains controls for selecting the direction of operation of each hydraulic cylinder. In this fashion, the operator may exercise complete control over the specific movement of each hydraulic cylinder, thereby positioning and leveling the internal load of the trailer. The switch positions on the controller are sensed by an internal encoder, which sends a coded electrical signal to a decoding circuit mounted to the trailer body. The decoding circuit decodes the electrical signals, and routes the necessary operating commands to each appropriate hydraulic valve.

In the preferred embodiment, each hydraulic cylinder is further equipped with an anti-collapse valve, which prevents the catastrophic deflation of any hydraulic valve under catastrophic loss of pressure, thereby enhancing the safety of the overall system. In the preferred embodiment, the safety valve consists of a pilot valve which measures the overall difference in pressure between the various components of the cylinder, and checks rapid depletion of the hydraulic fluid supporting the cylinder in the event of unexpected leakage. Other actuators, such as pneumatic cylinders, may also be used.

Having thus described my invention, it will be obvious to those skilled in the art that numerous modifications may be made to the invention as disclosed, without departing from the invention which I claim as follows:

1. A trailer for carrying assembled wheeled vehicles comprising:
   (A) a chassis;
   (B) a metal framework mounted on said chassis;
   (C) a multi-sided enclosure mounted on said chassis and said framework;
   (D) a plurality of openings in at least one side of said enclosure, said openings being disposed to allow direct access to said assembled wheeled vehicles;
   (E) a plurality of doors, each of said doors being movably disposed to cover and uncover a corresponding one of said plurality of openings;
   (F) a plurality of elongated plateforms located within said enclosure;
   (G) a plurality of actuators located within said enclosure, each said actuator having both mounting means and output means;
   (H) means for attachment of each said actuator between one of each said platforms and said framework;
   (I) means for individually and remotely operating each said actuator;
   (J) a plurality of axles mounted to the underside of said chassis;
   (K) a plurality of wheels;
   (L) means for mounting one of each of said wheels on opposing ends of each said axle;
   (M) means for attachment of said trailer to a motorized tractor vehicle;
   (N) a liftable roof mounted on said enclosure; and
   (O) locking means interconnecting said roof and said plurality of doors, and locking said plurality of doors in the closed position when said roof is moved to a lowermost position.

2. The invention of claim 1 which further comprises a plurality of hoisting points attached to said framework and accessible from the exterior of said enclosure.

3. The invention of claim 1 which further comprises a cavity on the underside, forward portion of said trailer adapted to surround and engage the vertical protrusion of a TTUX rail car.

4. The invention of claim 1 which further comprise, mounted on at least one said axle, a pair of fixed guides, wherein one said guide is located inboard of each said wheel at a position approximating the position of the inboard surface of the inboard wheel on a conventional tandem wheel trailer axle.

5. The invention of claim 1 wherein said framework further comprises:
   (A) a plurality of vertical frame members having a series of equally spaced apart holes along the exterior and disposed at intervals;
   (B) means for slidably connecting said tracks to said frame members;
   (C) resettable means for restricting the movement of said tracks in relation to said frame members which further comprises:
      (1) a collar having, in cross section, an internal shape substantially identical to the external shape, in cross section of said vertical frame member, said collar being of sufficient dimension to slidably fit on said vertical frame member,
      (2) a pivotably mounted, substantially L-shaped pin attached to the exterior of said collar, and disposed so as to permit one end of said pivotably-mounted pin to engage one of said holes, and
      (3) an extension attached to said pin at its end opposite the end disposed to engage such holes.

6. The invention of claim 1 wherein said enclosure further comprises, at its forward end, a hollow, curved compartment.

7. A trailer for carrying assembled wheeled vehicles comprising:
   (A) a chassis;
   (B) a metal framework mounted on said chassis;
   (C) a multi-sided enclosure mounted on said chassis and said framework;
   (D) a plurality of openings in at least one side of said enclosure, said openings being disposed to allow direct access to said assembled wheeled vehicles;
   (E) a plurality of doors, each of said doors being movably disposed to cover and uncover a corresponding one of said plurality of openings;
   (F) a plurality of elongated platforms located within said enclosure;
   (G) a plurality of actuators located within said enclosure, each said actuator having both mounting means and output means;

(H) means for attachment of each said actuator between one of each said platforms and said framework;
(I) a plurality of axles mounted to the underside of said chassis;
(J) a plurality of wheels;
(K) means for mounting one of each said wheels on opposing ends of each said axle;
(L) means for attachment of said trailer to a motorized tractor vehicle;
(M) a liftable roof mounted on said enclosure;
(N) an opening in the rearmost side of said enclosure of sufficient size to permit ingress and egress of said assembled wheeled vehicles to and from the interior of said enclosure;
(O) a door pivotably mounted over said opening in said rearmost side of said enclosure, said pivotable mounted door being attached by a hinge at its lower edge to the lower edge of said opening in said rearmost side of said enclosure;
(P) second actuating means for opening and closing said door in said rearmost side of said enclosure;
(Q) third actuating means for lifting and lowering said roof;
(R) means for individually and remotely operating each said actuator and said second and third actuating means; and
(S) locking means interconnecting said roof, said side doors and said rearmost door, and locking said side doors and said rearmost doors in the closed position when said roof is moved to a lowermost position.

8. The invention of claim 7 which further comprises a plurality of hoisting points attached to said framework and accessible from the exterior of said enclosure.

9. The invention of claim 7 which further comprises a cavity on the underside, forward portion of said trailer adapted to surround and engage the vertical protrusion of a TTUX rail car.

10. The invention of claim 7 which further comprise, mounted on at least one said axle, a pair of fixed guides, wherein one said guide is located inboard of each said wheel at a position approximating the position of the inboard surface of the inboard wheel on a conventional tandem wheel trailer axle.

11. The invention of claim 7 wherein said framework further comprises:
(A) a plurality of vertical frame members having a series of equally spaced apart holes along the exterior and disposed at intervals;
(B) means for slidably connecting said tracks to said frame members;
(C) resettable means for restricting the movement of said tracks in relation to said frame members which further comprises:
 (1) a collar having, in cross section, an internal shape substantially identical to the external shape, in cross section of said vertical frame member, said collar being of sufficient dimension to slidably fit on said vertical frame member,
 (2) a pivotably mounted, substantially L-shaped pin attached to the exterior of said collar, and disposed so as to permit one end of said pivotably-mounted pin to engage one of said holes, and
 (3) an extension attached to said pin at its end opposite the end disposed to engage such holes.

12. The invention of claim 7, wherein said enclosure further comprises, at its forward end, a hollow, curved compartment.

13. A trailer for carrying assembled wheeled vehicles comprising:
(A) a chassis;
(B) a metal framework mounted on said chassis;
(C) a multi-sided enclosure mounted on said chassis and said framework;
(D) a plurality of openings in at least one side of said enclosure, said openings being disposed to allow direct access to said assembled wheeled vehicles;
(E) a plurality of doors, each of said doors being movably disposed to cover and uncover a corresponding one of said plurality of openings;
(F) a plurality of elongated platforms located within said enclosure;
(G) a plurality of actuators located within said enclosure, each said actuator having both mounting means and output means;
(H) means for attachment of each said actuator between one of each said platforms and said framework;
(I) means for individually and remotely operating each said actuator;
(J) a plurality of axles mounted to the underside of said chassis;
(K) a plurality of wheels;
(L) means for mounting one of each of said wheels on opposing ends of each said axle;
(M) means for attachment of said trailer to a motorized tractor vehicle;
(N) a plurality of hoisting points attached to said framework and accessible from the exterior of said enclosure;
(O) a cavity on the underside, forward portion of said trailer adapted to surround and engage the vertical protrusion of a TTUX rail car;
(P) a liftable roof mounted on said enclosure; and
(Q) locking means interconnecting said roof and said plurality of doors, and locking said plurality of doors in the closed position when said roof is moved to a lowermost position.

14. A trailer for carrying assembled wheeled vehicles comprising:
(A) a chassis;
(B) a metal framework mounted on said chassis;
(C) a multi-sided enclosure mounted on said chassis and said framework;
(D) a plurality of openings in at least one side of said enclosure, said openings being disposed to allow direct access to said assembled wheeled vehicles;
(E) a plurality of doors, each of said doors being movably disposed to cover and uncover a corresponding one of said plurality of openings;
(F) a plurality of elongated platforms located within said enclosure;
(G) a plurality of actuators located within said enclosure, each said actuator having both mounting means and output means;
(H) means for attachment of each said actuator between one of each said platforms and said framework;
(I) a plurality of axles mounted to the underside of said chassis;
(J) a plurality of wheels;
(K) means for mounting one of each of said wheels on opposing ends of each said axle;

(L) means for attachment of said trailer to a motorized tractor vehicle;

(M) a liftable roof mounted on said enclosure;

(N) an opening in the rearmost side of said enclosure of sufficient size to permit ingress and egress of said assembled wheeled vehicles to and from the interior of said enclosure;

(O) a door pivotably mounted over said opening in said rearmost side of said enclosure, said pivotable mounted door being attached by a hinge at its lower edge to the lower edge of said opening in said rearmost side of said enclosure;

(P) second actuating means for opening and closing said door in said rearmost side of said enclosure;

(Q) third actuating means for lifting and lowering said roof;

(R) means for individually and remotely operating each said actuator and said second and third actuating means;

(S) locking means interconnecting said roof, said side doors and said rearmost door, and locking said side doors and said rearmost doors in the closed position when said roof is moved to a lowermost position;

(T) a plurality of hoisting points attached to said framework and accessible from the exterior of said enclosure; and (U) a cavity on the underside, forward portion of said trailer adapted to surround and engage the vertical protrusion of a TTUX rail car.

15. The invention of claim 13 which further comprises, mounted on at least one said axle, a pair of fixed guides, wherein one said guide is located inboard of each said wheel at a position approximating the position of the inboard surface of the inboard wheel on a conventional tandem wheel trailer axle.

16. The invention of claim 13 wherein said framework further comprises:

(A) a plurality of vertical frame members having a series of equally spaced apart holes along the exterior and disposed at intervals;

(B) means for slidably connecting said tracks to said frame members;

(C) resettable means for restricting the movement of said tracks in relation to said frame members which further comprises:

(1) a collar having, in cross section, an internal shape substantially identical to the external shape, in cross section of said vertical frame member, said collar being of sufficient dimension to slidably fit on said vertical frame member, (2) a pivotably mounted, substantially L-shaped pin attached to the exterior of said collar, and disposed so as to permit one end of said pivotably-mounted pin to engage one of said holes, and (3) an extension attached to said pin at its end opposite the end disposed to engage such holes.

17. The invention of claim 13 wherein said enclosure further comprises, at its forward end, a hollow, curved compartment.

18. The invention of claim 14 which further comprise, mounted on at least one said axle, a pair of fixed guides, wherein one said guide is located inboard of each said wheel at a position approximating the position of the inboard wheel on a conventional tandem wheel trailer axle.

19. The invention of claim 14 wherein said framework further comprises:

(A) a plurality of vertical frame members having a series of equally spaced apart holes along the exterior and disposed at intervals;

(B) means for slidably connecting said tracks to said frame members;

(C) resettable means for restricting the movement of said tracks in relation to said frame members which further comprises:

(1) a collar having, in cross section, an internal shape substantially identical to the external shape, in cross section of said vertical frame member, said collar being of sufficient dimension to slidably fit on said vertical frame member, (2) a pivotably mounted, substantially L-shaped pin attached to the exterior of said collar, and disposed so as to permit one end of said pivotably-mounted pin to engage one of said holes, and (3) an extension attached to said pin at its end opposite the end disposed to engage such holes.

20. The invention of claim 14 wherein said enclosure further comprises, at its forward end, a hollow, curved compartment.

21. A trailer as in any one of the preceding claims, in which said means for individually and remotely operating each said actuator further comprises:

(A) a plurality of independently controllable hydraulic cylinders associated with said plurality of tracks;

(B) means for attachment of one of each said cylinders between one point on said framework and one end of each said tracks;

(C) hydraulic power source means to pressurize and depressurize each said cylinder; and (D) electronic control means for individually regulating the pressure of said hydraulic power in each said cylinder.

* * * * *